(12) United States Patent
Chen et al.

(10) Patent No.: US 11,071,117 B2
(45) Date of Patent: Jul. 20, 2021

(54) RESOURCE DETERMINATION METHOD, BASE STATION, AND MOBILE STATION

(71) Applicant: NTT DOCOMO, INC., Tokyo (JP)

(72) Inventors: Xiaohang Chen, Beijing (CN); Anxin Li, Beijing (CN); Qin Mu, Beijing (CN); Liu Liu, Beijing (CN); Huiling Jiang, Beijing (CN); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 166 days.

(21) Appl. No.: 16/326,602

(22) PCT Filed: Aug. 18, 2017

(86) PCT No.: PCT/CN2017/098020
§ 371 (c)(1),
(2) Date: Feb. 19, 2019

(87) PCT Pub. No.: WO2018/033134
PCT Pub. Date: Feb. 22, 2018

(65) Prior Publication Data
US 2020/0196297 A1    Jun. 18, 2020

(30) Foreign Application Priority Data
Aug. 19, 2016 (CN) .......................... 201610698343.9

(51) Int. Cl.
*H04W 72/04* (2009.01)
*H04W 4/70* (2018.01)

(52) U.S. Cl.
CPC .......... *H04W 72/048* (2013.01); *H04W 4/70* (2018.02); *H04W 72/0446* (2013.01); *H04W 72/0453* (2013.01)

(58) Field of Classification Search
CPC . H04W 72/048; H04W 4/70; H04W 72/0446; H04W 72/0453; H04W 72/08; H04W 72/042; H04W 72/12
See application file for complete search history.

(56) References Cited

U.S. PATENT DOCUMENTS

| | | | |
|---|---|---|---|
| 9,119,021 B2 | 8/2015 | Bucknell et al. | |
| 2007/0141995 A1* | 6/2007 | Youn | H04W 52/246 455/69 |

(Continued)

FOREIGN PATENT DOCUMENTS

| | | |
|---|---|---|
| CN | 103120004 A | 5/2013 |
| CN | 104756569 A | 7/2015 |

(Continued)

OTHER PUBLICATIONS

International Search Report for PCT/CN2017/098020, ISA/CN, Haidian District, Beijing, dated Oct. 11, 2017, with English translation attached.

(Continued)

*Primary Examiner* — Gregory B Sefcheck
*Assistant Examiner* — Joshua Smith
(74) *Attorney, Agent, or Firm* — Osha Bergman Watanabe & Burton LLP (57) ABSTRACT

Provided are a resource determination method, a base station and a mobile station. A resource determination method performed by the base station according to embodiments of the present invention includes: determining a resource configuration used for uplink transmission for each mobile station group in a plurality of mobile station groups corresponding to the base station; determining a resource offset set used for the plurality of mobile station groups, wherein the resource offset set includes a plurality of resource candidate offsets such that a mobile station connected to the base station determines uplink transmission resources for the (Continued)

mobile station according to the resource configuration of the mobile station group to which the mobile station belongs and resource candidate offsets in the resource offset set.

16 Claims, 3 Drawing Sheets

(56) References Cited

U.S. PATENT DOCUMENTS

| | | | | |
|---|---|---|---|---|
| 2009/0073870 | A1* | 3/2009 | Haartsen | H04W 76/19 370/216 |
| 2012/0127898 | A1* | 5/2012 | Lim | H04L 5/0044 370/281 |
| 2013/0142097 | A1* | 6/2013 | Gong | H04W 28/10 370/311 |
| 2013/0286957 | A1 | 10/2013 | Bucknell et al. | |
| 2014/0376433 | A1* | 12/2014 | Li | H04W 74/0816 370/311 |
| 2016/0242169 | A1 | 8/2016 | Park et al. | |
| 2018/0324841 | A1 | 11/2018 | Horiuchi et al. | |

FOREIGN PATENT DOCUMENTS

| | | |
|---|---|---|
| CN | 105594139 A | 5/2016 |
| EP | 3373675 A1 | 9/2018 |

OTHER PUBLICATIONS

European Search report issued in 17841106.2 dated Feb. 27, 2020.
Qualcomm Inc: "Physical Uplink Control Channels", vol. RAN Wg1, No. Malmo, Sweden Oct. 5, 2015-Oct. 9, 2015 (Oct. 4, 2015).
Huawei et al "Remaining details of PUCCH resource determination for MTC UEs", vol. RAN WG1, No. Anaheim, USA Nov. 15, 2015-200151122 (Nov. 15, 2015).

* cited by examiner

RESOURCE DETERMINATION METHOD, BASE STATION, AND MOBILE STATION

TECHNICAL FIELD

The present invention relates to the field of wireless communication, and in particular, to a resource determination method, a base station and a mobile station that can be used in a wireless communication system.

BACKGROUND

Machine Type Communication (MTC) has become an important technology used in 4G and 5G communication systems. Compared with LTE technology, in the MTC system, a mobile station transmits using a narrower bandwidth and performs a plurality of retransmissions to the same information. In the existing uplink transmission scheduling method, a base station transmits uplink grant (UL Grant) signaling to the mobile station, and the mobile station performs uplink transmission using the resources indicated by the uplink grant. However, since the mobile station performs the plurality of retransmissions to the same information in the MTC system, it may lead to the need for a large amount of control signaling if the uplink transmission scheduling of mobile stations in the MTC system is performed according to the existing scheduling method.

Moreover, Full-Dimensional Multiple Input Multiple Output (Full Dimensional MIMO, FD-MIMO) and Massive Multiple Input Multiple Output (Massive MIMO) antennas which are wireless transmission technologies of LTE (Long Term Evolution) researched by 3GPP (3rd Generation Partnership Project) have been proposed. Compared with traditional MIMO systems, in FD-MIMO and Massive MIMO systems, the base station can use more antennas for data transmission and support more mobile stations to improve system throughput. However, as the number of mobile stations that the base station can support increases, the signaling overhead for the uplink transmission scheduling is further increased according to the existing scheduling method. Therefore, the existing scheduling method is not suitable for the wireless communication system that combines Non-Orthogonal Multiple Access (NOMA) technology with MTC.

SUMMARY

According to one aspect of the present invention, there is provided a resource allocating method, comprising: determining a resource configuration used for uplink transmission for each mobile station group in a plurality of mobile station groups corresponding to the base station; determining a resource offset set used for the plurality of mobile station groups, wherein the resource offset set includes a plurality of resource candidate offsets such that a mobile station connected to the base station determines uplink transmission resources for the mobile station according to the resource configuration of the mobile station group to which the mobile station belongs and resource candidate offsets in the resource offset set.

According to another aspect of the present invention, there is provided a resource determination method performed by a mobile station, comprising: determining a first mobile station group to which a mobile station belongs from a plurality of mobile station groups corresponding to a base station to which the mobile station is connected; obtaining a first resource configuration and a resource offset set used for uplink transmission for the first mobile station group; selecting a first time resource candidate offset from a plurality of resource candidate offsets included in the resource offset set; and determining uplink transmission resources of the mobile station according to the first resource configuration and the first resource candidate offset.

According to another aspect of the present invention, there is provided a base station comprising: a configuration determining unit configured to determine a resource configuration used for uplink transmission for each mobile station group in a plurality of mobile station groups corresponding to the base station; an offset set determining unit configured to determine a resource offset set used for the plurality of mobile station groups, wherein the resource offset set includes a plurality of resource candidate offsets such that a mobile station connected to the base station determines uplink transmission resources for the mobile station according to the resource configuration of the mobile station group to which the mobile station belongs and resource candidate offsets in the resource offset set.

According to another aspect of the present invention, there is provided a mobile station comprising: a group determining unit configured to determine a first mobile station group to which a mobile station belongs from a plurality of mobile station groups corresponding to a base station to which the mobile station is connected; an obtaining unit configured to obtain a first resource configuration and a resource offset set used for uplink transmission for the first mobile station group; a selecting unit configured to select a first time resource candidate offset from a plurality of resource candidate offsets included in the resource offset set; and a resource determining unit configured to determine uplink transmission resources of the mobile station according to the first resource configuration and the first resource candidate offset.

With the scheduling vector generation method, the serial interference cancellation method, the base station, and the LTE mobile station according to the above aspect of the present invention, it is possible to perform the serial interference cancellation on the data transmitted by the MTC mobile station by generating a common MTC scheduling vector for the MTC mobile station that performs data transmission on each subband in the current TTI, so that the base station does not need to generate a dedicated scheduling vector for each MTC mobile station, which enables the wireless communication system to support the combined use of NOMA and MTC with as little signaling overhead as possible.

BRIEF DESCRIPTION OF THE DRAWINGS

The above and other objects, features and advantages of the present invention will become clearer by describing embodiments of the present invention in detail with reference to the accompanying drawings.

DESCRIPTION OF THE EMBODIMENTS

Hereinafter, a resource determination method, a base station and a mobile station according to embodiments of the present invention will be described below with reference to the accompanying drawings. Like reference numerals refer to like elements throughout the drawings. It should be understood that the embodiments described herein are merely illustrative and should not be constructed as limiting the scope of the present invention. Moreover, the UE described herein may include various types of user terminal, such as a mobile terminal (or referred to as a mobile station) or a fixed terminal. However, for convenience, the UE and the mobile station sometimes may be used interchangeably hereinafter.

In the examples according to the present invention, the resource configuration of uplink transmission may indicate resources that can be used for uplink transmission. For example, the resource configuration of uplink transmission may be pattern of time resources and pattern of frequency resources that can be used for uplink transmission in a predetermined interval.

Figure 1:
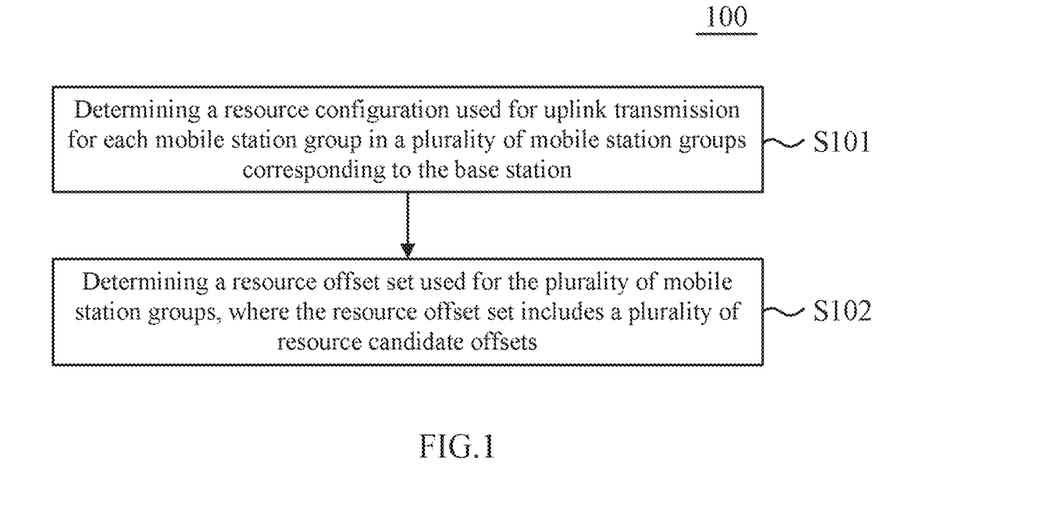
FIG. 1 shows a flow chart of a resource determination method performed by a base station according to the embodiments of the present invention.

Firstly, the resource determination method performed by the base station according to the embodiments of the present invention will be described with reference to FIG. 1. FIG. 1 shows a flow chart of the resource determination method 100. As shown in FIG. 1, in step S101, determining a resource configuration used for uplink transmission for each mobile station group in a plurality of mobile station groups corresponding to the base station. As described above, the resource configuration for uplink transmission may include the pattern of time resources and the pattern of frequency resources that can be used for uplink transmission. For example, the resource configuration for uplink transmission may indicate a period of time resources (for example, the number of Transmission Time Intervals (TTIs)) used by one mobile station in the mobile station group to perform uplink transmission, and may indicate subcarriers (for example, the number of subcarriers) used by the mobile station group to perform uplink transmission.

According to one example of the present invention, the plurality of mobile station groups corresponding to the base station may be determined according to channel states. In step S101, the resource configuration used for uplink transmission for the mobile station group may be determined according to channel states corresponding to respective mobile station groups. For example, the plurality of mobile station groups corresponding to the base station can be determined according to reference signal receiving powers of mobile stations. As another example, the plurality of mobile station groups corresponding to the base station can be determined according to path losses. In step S101, a first resource configuration used for a first mobile station group in the plurality of mobile station groups may be determined, and a second resource configuration used for a second mobile station group in the plurality of mobile station groups may be determined. When the path loss of the first mobile station group is smaller than the path loss of the second mobile station group, the channel state of mobile station(s) in the first mobile station group is better than the channel state of mobile station(s) in the second mobile station group. For example, the mobile station(s) in the first mobile station group may be mobile station(s) located in center area of a cell, and the mobile station(s) in the second mobile station group may be mobile station(s) located in edge area of the cell. In this case, the mobile station(s) in the first mobile station group can perform uplink transmission of a piece of information by a less number of retransmissions, while the mobile station(s) in the second mobile station group needs more number of retransmissions to successfully transmit a piece of information to the base station. Therefore, the first time resources indicated by the first resource configuration are less than the second time resources indicated by the second resource configuration, and the first frequency resources indicated by the first resource configuration are more than the second frequency resources indicated by the second resource configuration. For example, a period of the time resources indicated by the first resource configuration used by the first mobile station group when performing uplink transmission is shorter than a period of the time resources indicated by the second resource configuration used by the second mobile station group when performing uplink transmission, and first subcarriers indicated by the first resource configuration are more than second subcarriers indicated by the second resource configuration.

Optionally, the time and frequency resources indicated by the first resource configuration and the time and frequency resources indicated by the second resource configuration may at least partially overlap. For example, the time resources indicated by the first resource configuration may be part of the time resources indicated by the second resource configuration. For another example, the frequency resources indicated by the second resource configuration may be part of the frequency resources indicated by the first resource configuration.

Moreover, in order to facilitate the demodulation of an uplink signal sent by the mobile station and demodulated by the base station, optionally, the size of the second time resources may be integer times of the size of the first time resources, and the size of the first frequency resources is integer times of the size of the second frequency resources.

Figure 2:
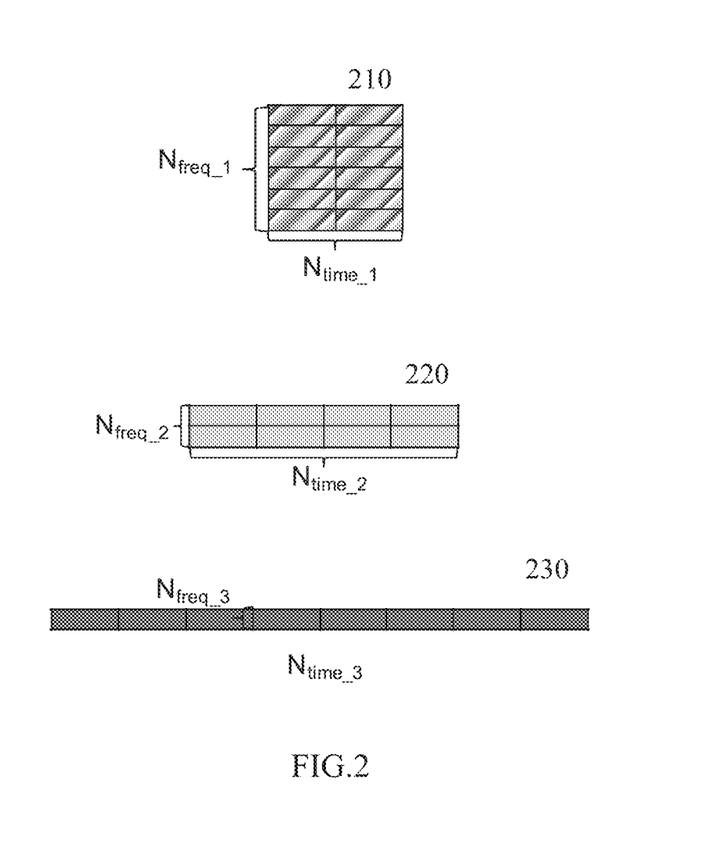
FIG. 2 is a schematic diagram showing resource configurations of uplink transmissions of respective mobile station groups determined according to one example of the present invention.

FIG. 2 is a schematic diagram showing resource configurations of uplink transmissions of respective mobile station groups determined according to one example of the present invention. In the example shown in FIG. 2, the mobile stations connected to the base station can be divided into three mobile station groups, that is, a central mobile station group located in the central area of the subordinate cell of the base station, an edge mobile station group located in the edge area of the subordinate cell of the base station, and an intermediate mobile station group located in the middle area between the central area and the edge area of the subordinate cell of the base station. According to step S101, a resource configuration 210 used for uplink transmission for the central mobile station group, a resource configuration 220 used for uplink transmission of the intermediate mobile station group, and a resource configuration 230 used for uplink transmission of the edge mobile station group may be determined.

Since the mobile station(s) in the central mobile station group can complete the information transmission with less number of retransmissions when the information needs to be transmitted to the base station, the mobile station(s) in the edge mobile station group need more number of retransmissions to complete the information transmission, and the mobile station(s) in the intermediate mobile station group need more number of retransmissions than the number of retransmissions needed to be performed by the mobile stations in the central mobile station group and less number of retransmissions than the number of retransmissions needed to be performed by the mobile stations in the edge mobile station group. Thus, the time resources able to be used for uplink transmission indicated by the resource configuration 210 are less than the time resources able to be used for uplink transmission indicated by the resource configuration 220, and the time resources able to be used for uplink transmission indicated by the resource configuration 220 are less than the time resources able to be used for uplink transmission indicated by the resource configuration 230. As shown in FIG. 2, according to the resource configuration 210, the time resource period $N_{time\_1}$ used for uplink transmission for the central mobile station group includes 2 Transmission Time Intervals (TTIs); according to the resource configuration 220, the time resource period $N_{time\_2}$ used for uplink transmission for the central mobile station group includes 4 TTIs; according to the resource configuration 230, the time resource period $N_{time\_3}$ used for uplink transmission for the central mobile station group includes 8 TTIs.

Moreover, more frequency resources can be allocated for mobile station groups requiring less time resources. As shown in FIG. 2, according to the resource configuration 210, the frequency resource $N_{freq\_1}$ used for uplink transmission for the central mobile station group includes 6 subcarriers; according to the resource configuration 220, the frequency resource $N_{freq\_2}$ used for uplink transmission for the central mobile station group includes 2 subcarriers; according to the resource configuration 230, the frequency resource $N_{freq\_3}$ used for uplink transmission for the central mobile station group includes 1 subcarrier.

Figure 3:
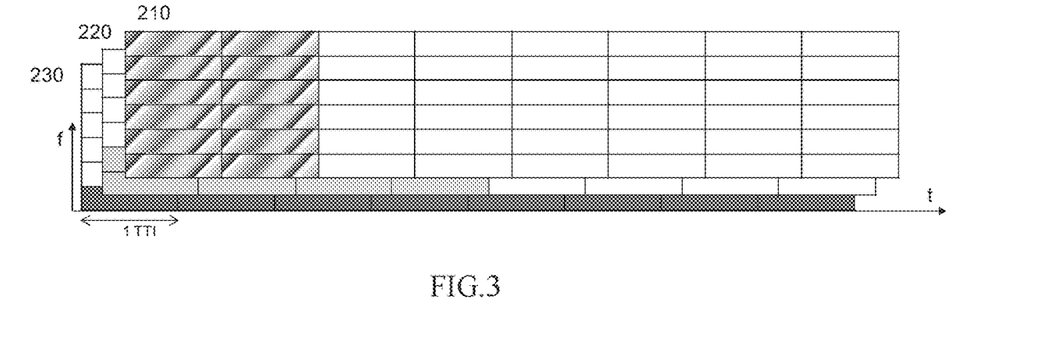
FIG. 3 is an illustrative diagram showing one example case of the resource configuration shown in FIG. 2.

FIG. 3 is an illustrative diagram showing one example case of the resource configuration shown in FIG. 2. As shown in FIG. 3, the plurality of mobile station groups corresponding to the base station may have the same start time for uplink transmission and the same start frequency for uplink transmission. In this case, when the frequency component is not considered, as shown in FIG. 3, the resource configuration 210, the resource configuration 220, and the resource configuration 230 partially overlap.

In FIG. 2 and FIG. 3, a partial overlap of time resources and frequency resources indicated by the plurality of resource configurations is described as an example, but the present invention is not limited thereto. According to another example of the present invention, the indicated time resources used for the plurality of mobile station groups may be identical, and similarly, the indicated frequency resources for the plurality of mobile station groups may also be identical. In the case where the plurality of mobile station groups corresponding to the base station are determined according to the channel states, even if the indicated frequency resources used for the plurality of mobile station groups are identical, the base station may also demodulate the information transmitted from mobile stations in different mobile station groups according to the channel states of respective mobile station groups.

Moreover, according to another example of the present invention, the indicated time resources used for the plurality of mobile station groups may not overlap, and similarly, the indicated frequency resources used for the plurality of mobile station groups may also not overlap.

Returning to FIG. 1, in step S102, determining a resource offset set used for the plurality of mobile station groups, where the resource offset set includes a plurality of resource candidate offsets such that the mobile station connected to the base station can determine uplink transmission resources for the mobile station according to the resource configuration of the mobile station group to which the mobile station belongs and resource candidate offset(s) in the resource offset set. For example, in step S102, one common resource offset set used for the plurality of mobile station groups can be determined. In this case, the plurality of mobile station groups can use the same common resource offset set. For another example, in step S102, a resource offset set used for each mobile station group in the plurality of mobile station groups may be determined. Moreover, in a case where the resource configuration for uplink transmission includes pattern of time resources and pattern of frequency resources that can be used for uplink transmission, in step S102, a time resource offset set and a frequency resource offset set used for the plurality of mobile station groups can be determined.

According to one example of the present invention, a plurality of resource candidate offsets included in the resource offset set may be determined according to a base offset. For example, when one common resource offset set used for the plurality of mobile station groups is determined in step S102, each resource candidate offset in the common resource offset set is integer times of the base offset. The resource candidate offsets will be further explained later in connection with the resource determination method performed by the mobile station.

Moreover, optionally, the base offset is determined according to an uplink transmission resource unit of one mobile station group in the plurality of mobile station groups, where the uplink transmission resource unit is the resources used by the mobile stations in the mobile station group when performing one uplink transmission. For example, as described above, the resource configuration for uplink transmission may indicate the period of time resources used by one mobile station in the mobile station group when performing uplink transmission. During this period, the mobile station adopting MTC technology can transmit the same information many times. The uplink transmission resource unit may be the resources used for one uplink transmission by the mobile station in the mobile station group.

Moreover, since the mobile station adopting MTC technology can transmit the same information many times in one uplink transmission period indicated by the resource configuration, the method shown in FIG. 1 may further comprise determining the number of uplink transmissions of each mobile station group. The number of uplink transmissions of each mobile station group can be directly determined. For example, it can be determined that the mobile station performs 2 uplink transmissions for the same information in one uplink transmission period. Alternatively, the number of uplink transmissions of each mobile station group may also be determined by determining the uplink transmission resource unit for each mobile station group.

Moreover, the method illustrated in FIG. 1 can further comprise transmitting configuration information of the resource configuration and offset set information of the resource offset set to the mobile station(s) in each mobile station group. Moreover, in the case of determining the number of uplink transmissions of each mobile station group, the method illustrated in FIG. 1 may further comprise transmitting retransmission information of the number of uplink transmissions to the mobile station(s) in each mobile station group.

In the resource determination method of the present embodiment, the mobile station connected to the base station can determine the uplink transmission resources for the mobile station according to the resource configuration of the mobile station group to which the mobile station belongs and the resource candidate offsets in the resource offset set, by grouping the mobile stations connected to the base station, determining the resource configurations used for uplink transmission for respective mobile station groups and determining the resource offset set. Therefore, while reducing the signaling overhead required for uplink grant (UL Grant) signaling, it reduces the possibility of collision among the transmitted information when different mobile stations use the same resource to transmit uplink information, and degrades the difficulty of decoding by the base station when different mobile stations use the same resource to transmit uplink information.

Figure 4:
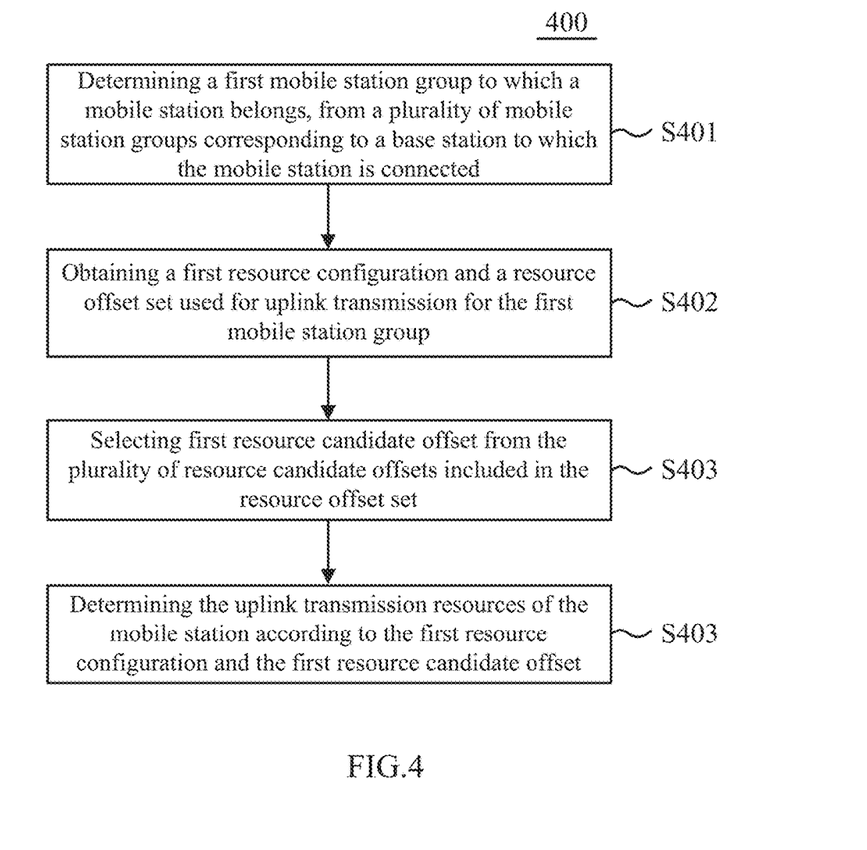
FIG. 4 shows a flow diagram of a resource determination method performed by a mobile station according to the embodiments of the present invention.

Next, a resource determination method performed by a mobile station according to the embodiments of the present invention will be described with reference to FIG. 4. FIG. 4 shows a flow diagram of the resource determination method 400 performed by the mobile station according to the embodiments of the present invention.

As shown in FIG. 4, in step S401, determining a first mobile station group to which a mobile station belongs, from a plurality of mobile station groups corresponding to a base station to which the mobile station is connected. According to one example of the present invention, the first mobile station group to which the mobile station belongs may be determined according to the channel state of the mobile station. For example, the first mobile station group to which the mobile station belongs may be determined according to a Reference Signal Receiving Power (RSRP) of the mobile station. For another example, the plurality of mobile station groups corresponding to the base station may be determined according to path losses of mobile stations.

Then, in step S402, obtaining a first resource configuration and a resource offset set used for uplink transmission for the first mobile station group. For example, resource configurations and resource offset sets of respective mobile station groups may be pre-stored in the mobile station, and the first resource configuration and the resource offset set used for uplink transmission for the first mobile station group are selected from the pre-stored resource configurations and resource offset sets of respective mobile station groups according to the determined mobile station groups. For another example, configuration information of the resource configuration and offset set information of the resource offset set may be received from the base station, and the first resource configuration and the resource offset set used for uplink transmission for the first mobile station group are selected from the determined resource configurations and resource offset sets of respective mobile station groups based on the received information according to the determined mobile station groups.

As described above, the resource configuration for uplink transmission may include pattern of time resources and pattern of frequency resources that can be used for uplink transmission. For example, the resource configuration for uplink transmission may indicate a period of time resources (for example, the number of Transmission Time Intervals) used by one mobile station in the mobile station group to perform uplink transmission, and may indicate subcarriers (for example, the number of subcarriers) used by the mobile station group to perform uplink transmission.

Moreover, in the case where the channel states are determined according to the path losses and further the first mobile station group to which the mobile station belongs is determined according to the channel states, when the path loss of the first mobile station group is smaller than the path loss of the second mobile station group, first time resources indicated by the first resource configuration are less than second time resources indicated by the second resource configuration used for uplink transmission of the first mobile station group, and first frequency resources indicated by the first resource configuration are more than second frequency resources indicated by the second resource configuration.

For example, the mobile station(s) in the first mobile station group to which the mobile station belongs may be mobile station(s) located in center area of a cell with small pass loss(es); and the mobile station(s) in the second mobile station group may be mobile station(s) located in edge area of the cell with large pass loss(es). In this case, the mobile station(s) in the first mobile station group can perform uplink transmission of a piece of information by a less number of retransmissions, while the mobile station(s) in the second mobile station group needs more number of retransmissions to successfully transmit a piece of information to the base station. Therefore, the first time resources indicated by the first resource configuration are less than the second time resources indicated by the second resource configuration, and the first frequency resources indicated by the first resource configuration are more than the second frequency resources indicated by the second resource configuration. For example, the period of the time resources indicated by the first resource configuration used by the first mobile station group when performing uplink transmission is shorter than the period of the time resources indicated by the second resource configuration used by the second mobile station group when performing uplink transmission, and the first subcarriers indicated by the first resource configuration are more than the second subcarriers indicated by the second resource configuration.

Optionally, the time and frequency resources indicated by the first resource configuration of the mobile station and the time and frequency resources indicated by the second resource configuration may at least partially overlap. For example, the time resources indicated by the first resource configuration may be part of the time resources indicated by the second resource configuration. For another example, the frequency resources indicated by the second resource configuration may be part of the frequency resources indicated by the first resource configuration.

Moreover, optionally, the size of the second time resources may be integer times of the size of the first time resources, and the size of the first frequency resources is integer times of the size of the second frequency resources. The size of the time resources and the size of the frequency resources have been described above with reference to FIG. 2 and FIG. 3, and therefore will not be described herein.

Moreover, the resource offset set obtained in step S402 may be a common resource offset set for the plurality of mobile station groups corresponding to the base station to which the mobile station is connected. Alternatively, the plurality of mobile station groups may correspond to different resource offset sets. In step S402, the resource offset set used for the first mobile station group may be obtained.

The resource offset set included a plurality of resource candidate offsets. In step S403, the first resource candidate offset may be selected from the plurality of resource candidate offsets included in the resource offset set. For example, the first resource candidate offset may be randomly selected from the plurality of resource candidate offsets included in the resource offset set. As another example, the first resource candidate offset may be selected according to a predetermined probability. The predetermined probability C can be determined by the following formula (1):

$$C = (Np - 1)/N \qquad (1)$$

where N represents the number of resource candidate offsets included in the resource offset set, and Np represents a predetermined value determined based on the average number of resources of UE groups.

Moreover, in a case where the resource configuration for uplink transmission includes pattern of time resources and pattern of frequency resources that can be used for uplink transmission, in step S403, the first time resource candidate offset may be selected from the plurality of resource candidate offsets included in the resource offset set used for the time resources; and the first frequency resource candidate offset may be selected from the plurality of resource candidate offsets included in the resource offset set used for the frequency resources. For example, the resource candidate offset $\Delta T_k$ used for the time resources may be expressed by the following formula (2):

$$\Delta T_k = \Delta t_c * N_{time\_k} \quad (2)$$

where $\Delta t_c$ represents a time shift coefficient, $\Delta t_c \in \{\Delta t_1, \Delta t_2, \ldots, \Delta t_n\}$, and $\Delta t_c$ may be integer times of the base offset $\Delta t_c$ and $N_{time\_k}$ represents the time resources (e.g., the number of TTIs) indicated in the kth resource configuration.

Moreover, the resource candidate offset $\Delta F_k$ used for the time resources can be expressed by the following formula (3):

$$\Delta F_k = \Delta f_c * N_{frep\_k} \quad (3)$$

where $\Delta f_c$ represents a time offset coefficient, $\Delta f_c \in \{\Delta f_1, \Delta f_2, \ldots, \Delta f_n\}$, and $\Delta f_c$ may be integer times of the base offset $\Delta t_c$ and $N_{frep\_k}$ represents the frequency resources (e.g., the number of subcarriers) indicated in the kth resource configuration.

Then, in step S404, the uplink transmission resources of the mobile station are determined according to the first resource configuration and the first resource candidate offset. For example, the start position of uplink transmission of the mobile station may be determined according to the uplink transmission reference resources and the first resource candidate offset, where the uplink transmission reference resources are common uplink transmission reference resources of the mobile station(s) in the plurality of mobile station groups. For example, the start time $T_{tx\_k}$ of uplink transmission can be expressed by the following formula (4):

$$T_{tx\_k} = T_{ref} + \Delta T_k \quad (4)$$

where $T_{ref}$ represents the common uplink transmission reference time resources of the mobile station(s) in the plurality of mobile station groups in a time period.

For another example, the start frequency $F_{tx\_k}$ of uplink transmission can be expressed by the following formula (5):

$$F_{tx\_k} = F_{ref} \Delta F_k \quad (5)$$

where $F_{ref}$ represents the common uplink transmission reference frequency resources of the mobile station in the plurality of mobile station groups in a frequency band.

Then, the uplink transmission resources of the mobile station are determined according to the first resource configuration and the start position. In the resource determination method of the present embodiment, the mobile station determines the resources configuration used for uplink transmission by determining the mobile station group to which the mobile station belongs, and determine the uplink transmission resources for the mobile station by the resource configuration of the mobile station group to which the mobile station belongs and the resource candidate offset in the resource offset set. Thus, the signaling overhead required for uplink grant (UL Grant) signaling is reduced. In addition, when a plurality of mobile stations in the same mobile station group need to perform uplink transmission in the same time period, the plurality of mobile stations may select different resource candidate offsets, thereby the start positions of uplink transmissions of the plurality of mobile stations are different. Therefore, even if the first resource configurations for the plurality of mobile stations are the same because the plurality of mobile stations belongs to the same group, collisions between signals transmitted by the plurality of mobile stations are avoided due to different start positions.

Moreover, optionally, in order to reduce the complexity of decoding by the base station, in the same uplink transmission period, the uplink transmission start time (or end time) of the mobile station belonging to the first mobile station group may be same as the uplink transmission start time (or end time) of the mobile station belonging to the other group of the mobile station groups. For example, the resource offset set obtained in step S402 may be a common resource offset set for the plurality of mobile station groups corresponding to the base station to which the mobile station is connected. In the case of the size of the second time resources being integer times of the size of the first time resources and the size of the first frequency resources are integer times of the size of the second frequency resources, optionally, the base offset may be determined according to an uplink transmission resource unit of one mobile station group in the plurality of mobile station groups, where the uplink transmission resource unit is resources used for one uplink transmission by the mobile station in the mobile station group. Thereby, the problem of the complexity of decoding process by the base station, which is caused due to the uplink transmission start time (or end time) of the mobile station belonging to the first mobile station group not being aligned with the uplink transmission start time (or end time) of the mobile station belonging to the other group, is avoided.

Moreover, since the mobile station adopting MTC technology can transmit the same information many times in one uplink transmission period indicated by the resource configuration, the method shown in FIG. 4 may further comprise determining the number of uplink transmissions of the first mobile station group; and transmitting the same information in uplink with the uplink transmission resources for the mobile station according to the determined number of uplink transmissions. For example, information of the number of uplink transmissions of respective mobile station groups may be pre-stored in the mobile station, and the number of uplink transmissions of the first mobile station group is obtained according to the determined mobile station groups. For another example, information of the number of uplink transmissions of respective mobile station groups may be received from the base station, and the number of uplink transmissions of the first mobile station group is obtained according to the determined mobile station groups. Moreover, the information of the number of uplink transmissions may directly indicate the number of uplink transmissions to be performed in the time resources indicated by the resource configuration of the mobile station group. The information of the number of uplink transmissions may also indicate the uplink transmission resource unit of the mobile station group, and the mobile station may determine the number of uplink transmissions of the mobile station group according to the uplink transmission resource unit and the time resources indicated by the resource configuration of the mobile station group.

Figure 5:
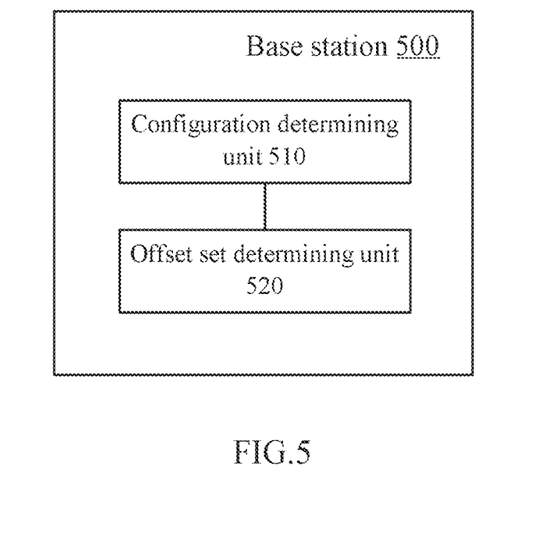
FIG. 5 shows a block diagram of the base station according to the embodiments of the present invention.

Next, a base station according to the embodiments of the present invention will be described with reference to FIG. 5. FIG. 5 shows a block diagram of the base station 500 according to the embodiments of the present invention. As shown in FIG. 5, the base station 500 comprises a configuration determining unit 510 and an offset set determining unit 520. The base station 500 may comprise other components in addition to these two units, however, since these components are not related to the content of the embodiments of the present invention, the illustration and description thereof are omitted here. In addition, since the specific details of the operations described below performed by the base station 500 according to the embodiments of the present invention are the same as those described above with reference to FIG. 1-FIG. 3, repeated description of the same details is omitted herein to avoid redundancy.

As shown in FIG. 5, the configuration determining unit 510 determines a resource configuration used for uplink transmission for each mobile station group in a plurality of mobile station groups corresponding to the base station. As described above, the resource configuration for uplink transmission may include the pattern of time resources and the pattern of frequency resources that can be used for uplink transmission. For example, the resource configuration for uplink transmission may indicate a period of time resources (for example, the number of Transmission Time Intervals) used by one mobile station in the mobile station group to perform uplink transmission, and may indicate subcarriers (for example, the number of subcarriers) used by the mobile station group to perform uplink transmission.

According to one example of the present invention, the plurality of mobile station groups corresponding to the base station may be determined according to channel states. The configuration determining unit 510 may determine the resource configuration used for uplink transmission for the mobile station group according to channel states corresponding to respective mobile station groups. For example, the configuration determining unit 510 may determine the plurality of mobile station groups corresponding to the base station according to reference signal receiving powers of mobile stations. As another example, the configuration determining unit 510 may determine the plurality of mobile station groups corresponding to the base station according to path losses.

The configuration determining unit 510 may determine a first resource configuration used for a first mobile station group in the plurality of mobile station groups, and determine a second resource configuration used for a second mobile station group in the plurality of mobile station groups. When the path loss of the first mobile station group is smaller than the path loss of the second mobile station group, the channel state of mobile station(s) in the first mobile station group is better than the channel state of mobile station(s) in the second mobile station group. For example, the mobile station(s) in the first mobile station group may be mobile station(s) located in center area of a cell, and the mobile station(s) in the second mobile station group may be mobile station(s) located in edge area of the cell. In this case, the mobile station(s) in the first mobile station group can perform uplink transmission of a piece of information by a less number of retransmissions, while the mobile station(s) in the second mobile station group needs more number of retransmissions to successfully transmit a piece of information to the base station. Therefore, the first time resources indicated by the first resource configuration are less than the second time resources indicated by the second resource configuration, and the first frequency resources indicated by the first resource configuration are more than the second frequency resources indicated by the second resource configuration. For example, a period of the time resources indicated by the first resource configuration used by the first mobile station group when performing uplink transmission is shorter than a period of the time resources indicated by the second resource configuration used by the second mobile station group when performing uplink transmission, and first subcarriers indicated by the first resource configuration are more than second subcarriers indicated by the second resource configuration.

Optionally, the time and frequency resources indicated by the first resource configuration and the time and frequency resources indicated by the second resource configuration may at least partially overlap. For example, the time resources indicated by the first resource configuration may be part of the time resources indicated by the second resource configuration. For another example, the frequency resources indicated by the second resource configuration may be part of the frequency resources indicated by the first resource configuration.

Moreover, in order to facilitate the demodulation of an uplink signal sent by the mobile station and demodulated by the base station, optionally, the size of the second time resources may be integer times of the size of the first time resources, and the size of the first frequency resources is integer times of the size of the second frequency resources.

According to one example of the present application, the indicated time resources and frequency resources indicated by the plurality of resource configurations may be partially overlap. According to another example of the present invention, the indicated time resources used for the plurality of mobile station groups may be identical, and similarly, the indicated frequency resources for the plurality of mobile station groups may also be identical. In the case where the plurality of mobile station groups corresponding to the base station are determined according to the channel states, even if the indicated frequency resources used for the plurality of mobile station groups are identical, the base station may also demodulate the information transmitted from mobile stations in different mobile station groups according to the channel states of respective mobile station groups. Moreover, according to another example of the present invention, the indicated time resources used for the plurality of mobile station groups may not overlap, and similarly, the indicated frequency resources used for the plurality of mobile station groups may also not overlap.

The offset set determining unit 520 may determine a resource offset set used for the plurality of mobile station groups, where the resource offset set includes a plurality of resource candidate offsets such that the mobile station connected to the base station can determine uplink transmission resources for mobile station according to the resource configuration of the mobile station group to which the mobile station belongs and resource candidate offset(s) in the resource offset set. For example, the offset set determining unit 520 may determine a common resource offset set used for the plurality of mobile station groups. In this case, the plurality of mobile station groups can use the same common resource offset set. For another example, the offset set determining unit 520 may determine a resource offset set used for each mobile station group in the plurality of mobile station groups. Moreover, in a case where the resource configuration for uplink transmission includes pattern of time resources and pattern of frequency resources that can be used for uplink transmission, the offset set determining unit 520 may determine a time resource offset set and a frequency resource offset set used for the plurality of mobile station groups.

According to one example of the present invention, a plurality of resource candidate offsets included in the resource offset set may be determined according to a base offset. For example, when the offset set determining unit 520 determines one common resource offset set used for the plurality of mobile station groups, each resource candidate offset in the common resource offset set is integer times of the base offset.

Moreover, optionally, the base offset is determined according to an uplink transmission resource unit of one mobile station group in the plurality of mobile station groups, where the uplink transmission resource unit is the resources used by the mobile stations in the mobile station group when performing one uplink transmission. For example, as described above, the resource configuration for uplink transmission may indicate the period of time resources used by one mobile station in the mobile station group when performing uplink transmission. During this period, the mobile station adopting MTC technology can transmit the same information many times. The uplink transmission resource unit may be the resources used for one uplink transmission by the mobile station in the mobile station group.

Moreover, since the mobile station adopting MTC technology can transmit the same information many times in one uplink transmission period indicated by the resource configuration, the base station shown in FIG. 5 may further comprise a transmission number determining unit, to determine the number of uplink transmissions of each mobile station group. The number of uplink transmissions of each mobile station group can be directly determined. For example, it can be determined that the mobile station performs 2 uplink transmissions for the same information in one uplink transmission period. Alternatively, the number of uplink transmissions of each mobile station group may also be determined by determining the uplink transmission resource unit for each mobile station group.

Moreover, the base station shown in FIG. 5 may further comprise a transmitting unit, to transmit configuration information of the resource configuration and offset set information of the resource offset set to the mobile station(s) in each mobile station group. Moreover, in the case of determining the number of uplink transmissions of each mobile station group, the transmitting unit may transmit retransmission information of the number of uplink transmissions to the mobile station(s) in each mobile station group.

In the base station of the present embodiment, the mobile station connected to the base station can determine the uplink transmission resources for the mobile station according to the resource configuration of the mobile station group to which the mobile station belongs and the resource candidate offsets in the resource offset set, by grouping the mobile stations connected to the base station, determining the resource configurations used for uplink transmission for respective mobile station groups and determining the resource offset set. Therefore, while reducing the signaling overhead required for uplink grant (UL Grant) signaling, it reduces the possibility of collision among the transmitted information when different mobile stations use the same resource to transmit uplink information, and degrades the difficulty of decoding by the base station when different mobile stations use the same resource to transmit uplink information.

Figure 6:
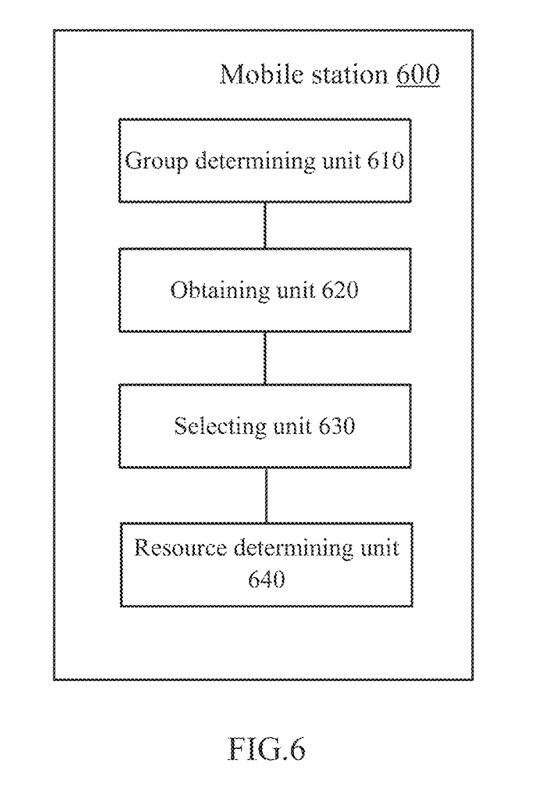
FIG. 6 shows a block diagram of the mobile station according to the embodiments of the present invention.

Next, a mobile station according to the embodiments of the present invention will be described with reference to FIG. 6. FIG. 6 shows a block diagram of the mobile station 600 according to the embodiments of the present invention. As shown in FIG. 6, the mobile station 600 comprises a group determining unit 610, an obtaining unit 620, a selecting unit 630 and a resource determining unit 640. The mobile station 600 may comprise other components in addition to these four units, however, since these components are not related to the content of the embodiments of the present invention, the illustration and description thereof are omitted here. In addition, since the specific details of the operations described below performed by the mobile station 600 according to the embodiments of the present invention are the same as those described above with reference to FIG. 4, repeated description of the same details is omitted herein to avoid redundancy.

As shown in FIG. 6, the group determining unit 610 determines a first mobile station group to which a mobile station belongs from a plurality of mobile station groups corresponding to a base station to which the mobile station is connected. According to one example of the present invention, the group determining unit 610 may determine the first mobile station group to which the mobile station belongs according to the channel state of the mobile station. For example, the group determining unit 610 may determine the first mobile station group to which the mobile station belongs according to a reference signal receiving power of the mobile station. For another example, the group determining unit 610 may determine the plurality of mobile station groups corresponding to the base station according to path losses of mobile stations.

Then, the obtaining unit 620 obtains a first resource configuration and a resource offset set used for uplink transmission for the first mobile station group. For example, the obtaining unit 620 may pre-store resource configurations and resource offset sets of respective mobile station groups in the mobile station, and select the first resource configuration and the resource offset set used for uplink transmission for the first mobile station group from the pre-stored resource configurations and resource offset sets of respective mobile station groups according to the determined mobile station groups. For another example, in this case, the mobile station 600 may further comprise a receiving unit, to receive configuration information of the resource configuration and offset set information of the resource offset set from the base station. The obtaining unit 620 may select the first resource configuration and the resource offset set used for uplink transmission for the first mobile station group from the determined resource configurations and resource offset sets of respective mobile station groups based on the received information according to the determined mobile station groups.

As described above, the resource configuration for uplink transmission may include pattern of time resources and pattern of frequency resources that can be used for uplink transmission. For example, the resource configuration for uplink transmission may indicate a period of time resources (for example, the number of Transmission Time Intervals) used by one mobile station in the mobile station group to perform uplink transmission, and may indicate subcarriers (for example, the number of subcarriers) used by the mobile station group to perform uplink transmission.

Moreover, in the case where the channel states are determined according to the path losses and further the first mobile station group to which the mobile station belongs is determined according to the channel states, when the path loss of the first mobile station group is smaller than the path loss of the second mobile station group, first time resources indicated by the first resource configuration are less than second time resources indicated by the second resource configuration used for uplink transmission for the first mobile station group, and first frequency resources indicated by the first resource configuration are more than second frequency resources indicated by the second resource configuration.

For example, the mobile station(s) in the first mobile station group to which the mobile station belongs may be mobile station(s) located in center area of a cell with small pass loss(es); and the mobile station(s) in the second mobile station group may be mobile station(s) located in edge area of the cell with large pass loss(es). In this case, the mobile station(s) in the first mobile station group can perform uplink transmission of a piece of information by a less number of retransmissions, while the mobile station(s) in the second mobile station group needs more number of retransmissions to successfully transmit a piece of information to the base station. Therefore, the first time resources indicated by the first resource configuration are less than the second time resources indicated by the second resource configuration, and the first frequency resources indicated by the first resource configuration are more than the second frequency resources indicated by the second resource configuration. For example, the period of the time resources indicated by the first resource configuration used by the first mobile station group when performing uplink transmission is shorter than the period of the time resources indicated by the second resource configuration used by the second mobile station group when performing uplink transmission, and the first subcarriers indicated by the first resource configuration are more than the second subcarriers indicated by the second resource configuration.

Optionally, the time and frequency resources indicated by the first resource configuration of the mobile station and the time and frequency resources indicated by the second resource configuration may at least partially overlap. For example, the time resources indicated by the first resource configuration may be part of the time resources indicated by the second resource configuration. For another example, the frequency resources indicated by the second resource configuration may be part of the frequency resources indicated by the first resource configuration.

Moreover, optionally, the size of the second time resources may be integer times of the size of the first time resources, and the size of the first frequency resources is integer times of the size of the second frequency resources. The size of the time resources and the size of the frequency resources have been described above with reference to FIG. 2 and FIG. 3, and therefore will not be described herein.

Moreover, the resource offset set obtained by the obtaining unit 620 may be a common resource offset set for the plurality of mobile station groups corresponding to the base station to which the mobile station is connected. Alternatively, the plurality of mobile station groups may correspond to different resource offset sets. The obtaining unit 620 may obtain the resource offset set used for the first mobile station group.

The resource offset set included a plurality of resource candidate offsets. The selecting unit 630 may select the first resource candidate offset from the plurality of resource candidate offsets included in the resource offset set. For example, the first resource candidate offset may be randomly selected from the plurality of resource candidate offsets included in the resource offset set. As another example, the first resource candidate offset may be selected according to a predetermined probability. The predetermined probability can be determined by the above formula (1).

Moreover, in a case where the resource configuration for uplink transmission includes pattern of time resources and pattern of frequency resources that can be used for uplink transmission, the selecting unit 630 may select the first time resource candidate offset from the plurality of resource candidate offsets included in the resource offset set used for the time resources; and the first frequency resource candidate offset is selected from the plurality of resource candidate offsets included in the resource offset set used for the frequency resources. For example, the resource candidate offset used for the time resources may be expressed by the above formula (2). Moreover, the resource candidate offset used for the time resources can be expressed by the above formula (3).

Then, the resource determining unit 640 may determine the uplink transmission resources of the mobile station according to the first resource configuration and the first resource candidate offset. For example, the resource determining unit 640 may determine the start position of uplink transmission of the mobile station according to the uplink transmission reference resources and the first resource candidate offset, where the uplink transmission reference resources are common uplink transmission reference resources of the mobile station(s) in the plurality of mobile station groups. For example, the start time of uplink transmission can be expressed by the above formula (4). Moreover, the start frequency of uplink transmission can be expressed by the above formula (5).

Then, the resource determining unit 640 may determine the uplink transmission resources of the mobile station according to the first resource configuration and the start position. The mobile station may further comprise a transmitting unit, to transmit information to the base station with the uplink transmission resources determined by the resource determining unit 640.

In the mobile station of the present embodiment, the resources configuration used for uplink transmission for the mobile station are determined by determining the mobile station group to which the mobile station belongs, and the uplink transmission resources for the mobile station are determined by the resource configuration of the mobile station group to which the mobile station belongs and the resource candidate offsets in the resource offset set. Thus, the signaling overhead required for uplink grant (UL Grant) signaling is reduced. In addition, when a plurality of mobile stations in the same mobile station group need to perform uplink transmission in the same time period, the plurality of mobile stations may select different resource candidate offsets, thereby the start positions of uplink transmissions of the plurality of mobile stations are different. Therefore, even if the first resource configurations for the plurality of mobile stations are the same because the plurality of mobile stations belongs to the same group, collisions between signals transmitted by the plurality of mobile stations are avoided due to different start positions.

Moreover, optionally, in order to reduce the complexity of decoding by the base station, in the same uplink transmission period, the uplink transmission start time (or end time) of the mobile station belonging to the first mobile station group may be same as the uplink transmission start time (or end time) of the mobile station belonging to the other group of the mobile station groups. For example, the resource offset set obtainable by the obtaining unit 620 may be a common resource offset set for the plurality of mobile station groups corresponding to the base station to which the mobile station is connected. In the case of the size of the second time resources being integer times of the size of the first time resources and the size of the first frequency resources are integer times of the size of the second frequency resources, optionally, the base offset may be determined according to an uplink transmission resource unit of one mobile station group in the plurality of mobile station groups, where the uplink transmission resource unit is resources used for one uplink transmission by the mobile station in the mobile station group. Thereby, the problem of the complexity of decoding process by the base station, which is caused due to the uplink transmission start time (or end time) of the mobile station belonging to the first mobile station group not being aligned with the uplink transmission start time (or end time) of the mobile station belonging to the other group, is avoided.

Moreover, since the mobile station adopting MTC technology can transmit the same information many times in one uplink transmission period indicated by the resource configuration, the mobile station shown in FIG. 6 may further comprise a transmission number determining unit, to determine the number of uplink transmissions of the first mobile station group. And the transmitting unit of the mobile station may transmit the same information in uplink with the uplink transmission resources for the mobile station according to the determined number of uplink transmissions. For example, information of the number of uplink transmissions of respective mobile station groups may be pre-stored in the mobile station, and the transmission number determining unit may obtain the number of uplink transmissions of the first mobile station group according to the determined mobile station groups. For another example, the receiving unit may receive information of the number of uplink transmissions of respective mobile station groups from the base station, and the transmission number determining unit may obtain the number of uplink transmissions of the first mobile station group according to the determined mobile station groups. Moreover, the information of the number of uplink transmissions may directly indicate the number of uplink transmissions to be performed in the time resources indicated by the resource configuration of the mobile station group. The information of the number of uplink transmissions may also indicate the uplink transmission resource unit of the mobile station group, and the mobile station may determine the number of uplink transmissions of the mobile station group according to the uplink transmission resource unit and the time resources indicated by the resource configuration of the mobile station group.

The operations of the base station 500 and the mobile station 600 can be implemented by hardware or by software module executed by processor, and can be further implemented by the combination of the above two. For example, the configuration determining unit 510 and the offset set determining unit 520 of the base station 500 can be implemented by the software module executed by the processor. For another example, the group determining unit 610, the obtaining unit 620, the selecting unit 630 and resource determining unit of the mobile station 600 can be implemented by the software module executed by the processor.

The software module may be arranged in a storage medium in any format, such as a RAM (Random Access Memory), a flash memory, a ROM (Read Only Memory), an EPROM (Erasable Programmable ROM), an EEPROM (Electrically Erasable Programmable ROM), a register, a hard disk, a removable disk, and a CD-ROM.

Such storage medium is connected to the processor so that the processor can write information into the storage medium or read information from the storage medium. Such storage medium can also be accumulated in the processor. Such storage medium and processor may be arranged in an ASIC. Such ASIC may be arranged in the base station 500 and the mobile station 600. As discrete components, such storage medium and processor may be arranged in the base station 500 and the mobile station 600.

Therefore, the present invention has been explained in detail by using the above embodiments; however, it is apparent for those skilled in the art that the present invention is not limited to the embodiments explained herein. The invention may be implemented in a corrected, modified mode without departing from the scope of the invention defined by the claims. Therefore, the description of the specification is only intended to explain the examples, and does not impose any limit on the present invention.

What is claimed is:

1. A resource determination method performed by a mobile station, comprising:
    determining a first mobile station group to which a mobile station belongs from a plurality of mobile station groups corresponding to a base station to which the mobile station is connected;
    obtaining a first resource configuration and a resource offset set used for uplink transmission for the first mobile station group;
    selecting a first time resource candidate offset from a plurality of resource candidate offsets included in the resource offset set;
    determining uplink transmission resources of the mobile station according to the first resource configuration and the first resource candidate offset;
    transmitting information to the base station according to the determined uplink transmission resources; and
    determining a resource configuration used for uplink transmission for each mobile station group in a plurality of mobile station groups corresponding to the base station according to a channel state corresponding to the mobile station group,
    wherein, determining the first mobile station group to which a mobile station belongs from a plurality of mobile station groups corresponding to a base station to which the mobile station is connected comprises:
        determining the channel state of the mobile station according to a path loss, and further
        determining the first mobile station group to which the mobile station belongs according to the channel states, and
    wherein, when a path loss of the first mobile station group is smaller than a path loss of a second mobile station group in the plurality of mobile station groups, first time resources indicated by the first resource configuration are less than second time resources indicated by a second resource configuration used for uplink transmission for the first mobile station group, and first frequency resources indicated by the first resource configuration are more than the second frequency resources indicated by the second resource configuration.

2. A base station comprising:
    a processor;
    a memory; and
    a computer program instruction stored on the memory which, when executed by the processor, causes the processor to:

determine a resource configuration used for uplink transmission for each mobile station group in a plurality of mobile station groups corresponding to the base station, and transmit the determined resource configuration to a corresponding mobile station group;

determine a resource offset set used for the plurality of mobile station groups, and transmit the determined resource offset set to the corresponding mobile station group, wherein the resource offset set includes a plurality of resource candidate offsets such that a mobile station connected to the base station determines uplink transmission resources for the mobile station according to the resource configuration of the mobile station group to which the mobile station belongs and resource candidate offsets in the resource offset set, wherein the processor determines a resource configuration used for uplink transmission for each mobile station group in a plurality of mobile station groups corresponding to the base station according to a channel state corresponding to the mobile station group, wherein, for each mobile station group in the plurality of mobile station groups corresponding to the base station, the processor determines the channel state corresponding to the mobile station group according to a path loss, and further determines resource configuration used for uplink transmission for the mobile station group according to the channel states, comprises:
  determines a first resource configuration used for a first mobile station group in the plurality of mobile station groups;
  determines a second resource configuration used for a second mobile station group in the plurality of mobile station groups, and
wherein when a path loss of the first mobile station group is smaller than a path loss of the second mobile station group, first time resources indicated by the first resource configuration are less than second time resources indicated by the second resource configuration, and first frequency resources indicated by the first resource configuration are more than the second frequency resources indicated by the second resource configuration.

3. The base station of claim 2, wherein
a size of the second time resources indicated by the second resource configuration for the second mobile station group in the plurality of mobile station groups is integer times of the size of the first time resources indicated by the first resource configuration for the first mobile station group in the plurality of mobile station groups,
a size of the first frequency resources indicated by the first resource configuration is integer times of the size of the second frequency resources indicated by the second resource configuration.

4. The base station of claim 2, wherein,
the processor determines one common resource offset set used for the plurality of mobile station groups.

5. The base station of claim 4, wherein
each resource candidate offset in the common resource offset set is integer times of a base offset.

6. The base station of claim 5, wherein,
the processor determines the base offset according to an uplink transmission resource unit of one mobile station group in the plurality of mobile station groups, wherein the uplink transmission resource unit is the resources used by mobile stations in the mobile station group performing one uplink transmission.

7. The base station of claim 2, wherein,
the processor determines the number of uplink transmissions of each mobile station group.

8. The base station of claim 2, wherein the processor:
transmits configuration information of the resource configuration and offset set information of the resource offset set to mobile stations in each mobile station group.

9. The base station of claim 8, wherein,
the processor transmits retransmission information of the number of uplink transmissions to mobile stations in each mobile station group.

10. A mobile station comprising:
a processor;
a memory; and
a computer program instruction stored on the memory which, when executed by the processor, causes the processor to:
determine a first mobile station group to which the mobile station belongs from a plurality of mobile station groups corresponding to a base station to which the mobile station is connected;
obtain a first resource configuration and a resource offset set used for uplink transmission for the first mobile station group;
select a first time resource candidate offset from a plurality of resource candidate offsets included in the resource offset set; and
determine uplink transmission resources of the mobile station according to the first resource configuration and the first resource candidate offset, and transmit information to the base station according to the determined uplink transmission resources,
wherein the processor determines a first mobile station group to which the mobile station belongs from a plurality of mobile station groups corresponding to a base station to which the mobile station is connected, according to a channel state of the mobile station,
wherein, the processor determines the channel state of the mobile station according to a path loss, and further determines the first mobile station group to which the mobile station belongs according to the channel states, and
wherein, when a path loss of the first mobile station group is smaller than a path loss of a second mobile station group in the plurality of mobile station groups, first time resources indicated by the first resource configuration are less than second time resources indicated by a second resource configuration used for uplink transmission for the first mobile station group, and first frequency resources indicated by the first resource configuration are more than the second frequency resources indicated by the second resource configuration.

11. The mobile station of claim 10, wherein,
the processor determines a start position of uplink transmission of the mobile station according to uplink transmission reference resources and the first resource candidate offset, wherein the uplink transmission reference resources are common uplink transmission reference resources of mobile stations in the plurality of mobile station groups; and
determines the uplink transmission resources of the mobile station according to the first resource configuration and the start position.

12. The mobile station of claim 10, wherein the processor:
   determines a number of uplink transmissions of the first mobile station group; and
   transmits the same information in uplink with the uplink transmission resources for the mobile station according to the determined number of uplink transmissions.

13. The mobile station of claim 10, wherein
   a size of second time resources indicated by the second resource configuration for the second mobile station group in the plurality of mobile station groups is integer times of the size of first time resources indicated by the first resource configuration for the first mobile station group in the plurality of mobile station groups,
   a size of first frequency resources indicated by the first resource configuration is integer times of the size of second frequency resources indicated by the second resource configuration.

14. The mobile station of claim 10, wherein
   the resource offset set is a common resource offset set used for the plurality of mobile station groups.

15. The mobile station of claim 14, wherein
   each resource candidate offset in the common resource offset set is integer times of a base offset.

16. The mobile station of claim 15, wherein,
   the processor determines the base offset according to an uplink transmission resource unit of one mobile station group in the plurality of mobile station groups, wherein the uplink transmission resource unit is the resources used by mobile stations in the mobile station group performing one uplink transmission.

* * * * *